United States Patent [19]

Haselbarth

[11] 4,166,958

[45] Sep. 4, 1979

[54] X-RAY FILM CASSETTE

[75] Inventor: Heinz Haselbarth, Glendale, N.Y.

[73] Assignee: GAF Corporation, New York, N.Y.

[21] Appl. No.: 867,041

[22] Filed: Jan. 5, 1978

[51] Int. Cl.² ............................................. G03D 13/08
[52] U.S. Cl. ..................................... 250/480; 250/481
[58] Field of Search .................................. 250/480, 481

[56] References Cited

U.S. PATENT DOCUMENTS

| 3,836,783 | 9/1974 | Stievenart | 250/280 |
| 4,032,790 | 6/1977 | Nakamura | 250/280 |

*Primary Examiner*—Craig E. Church

*Attorney, Agent, or Firm*—Walter C. Kehm; J. Gary Mohr

[57] ABSTRACT

An X-ray film cassette comprising of a rectangular body and a rectangular cover hinged to the body. The cover is secured by means of a pair of latches mounted on the side of the rectangular body which mate with latch means on the cover. The cover is deformed to be convex on the inside and is resilient. The cover has and body may have cushion pads on their inner surface to uniformly push intensifying sheets against an X-ray film in the cassette. The cushion pads are provided with a number of air release channels to improve the distribution of pressure thereof on the X-ray film.

3 Claims, 3 Drawing Figures

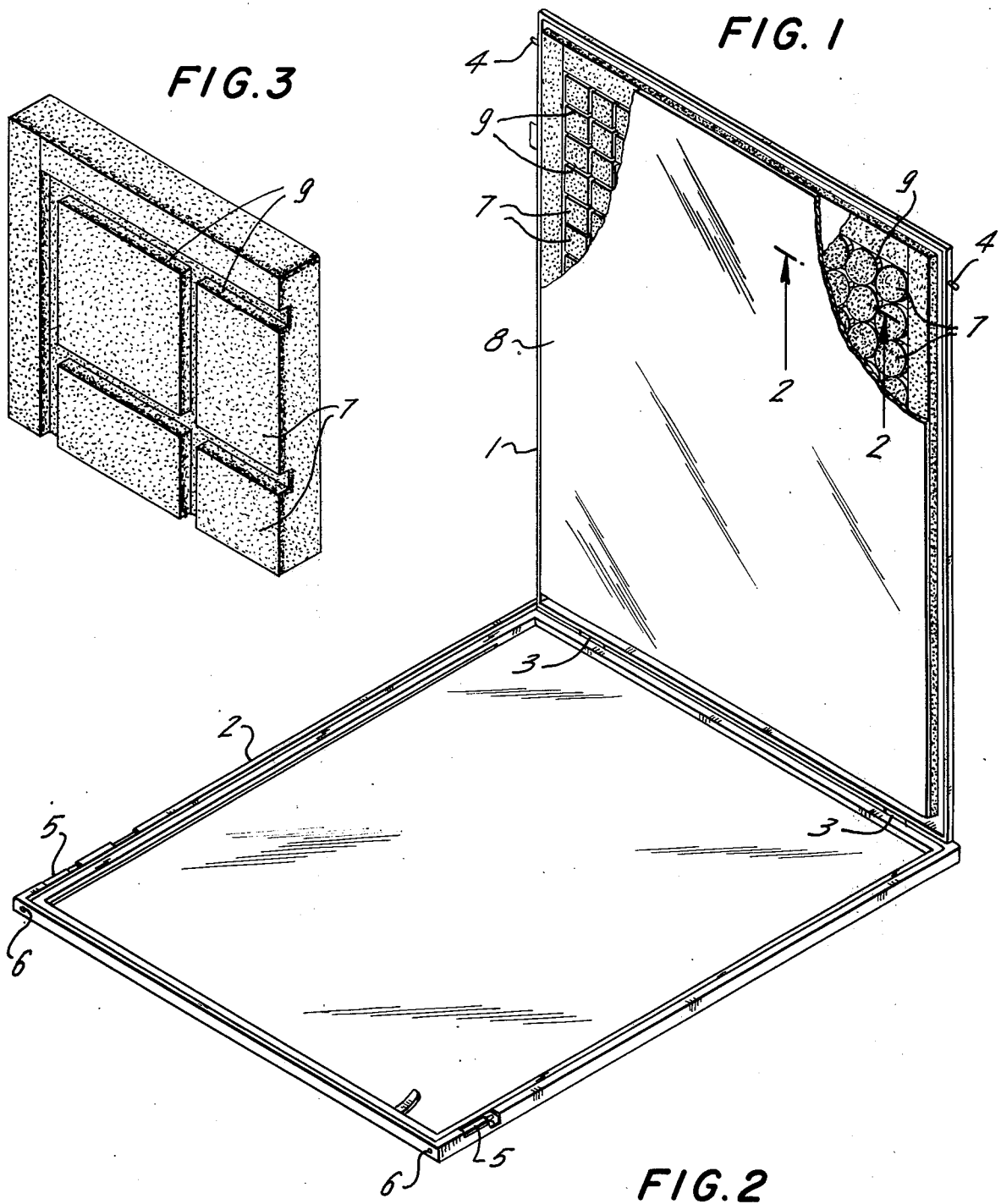

X-RAY FILM CASSETTE

BACKGROUND OF THE INVENTION

X-ray cassettes in the past have been composed of a rectangular body with a cover hinged to the body and a pair of intensifying sheets retained therein to interpose therebetween an X-ray film. A cushion pad is interposed between the cover and one intensifying sheet attached to the cover so as to press the intensifying sheet against the X-ray film. The cushion pad may be of sponge rubber, resilient foam, felt, or a cushion of elastic sheet material as disclosed in U.S. Pat. Nos. 2,359,522; 3,466,440; 3,482,097 and 3,964,107 respectfully. The rectangular shaped cover has hinge means on its rear edge and latch means on its sides. The hinge means have been composed of a pair of hinges to pivotally mount the cover at one side thereof to the body, and the latch means secure the cover to the cassette rectangular body.

The above described conventional X-ray film cassette has a defect in that the central portion of the cover is not sufficiently pressed against the body and accordingly the central portion of the intensifying sheet is not in perfect contact with the X-ray film. Therefore, uniformly sharp radiographic images are difficult to obtain with the conventional X-ray film cassette.

An improvement to these cassettes has been disclosed in U.S. Pat. No. 4,032,790 which provides a convexed resilient cover working in conjunction with a perforated resilient pad to provide better contact between the intensifying screens and the X-ray film. This improvement has a draw back, however, in that there is no interconnection between the perforated holes of the pad and therefore air can be trapped causing unequal contact between the intensifying screens and the X-ray film resulting in light and dark spots in the developed X-ray film.

The object of the present invention is to solve this air trap problem in order to obtain sharp radiographic images on the developed X-ray film.

SUMMARY OF THE INVENTION

The X-ray film cassette in accordance with the present invention is characterized in that the cushion means attached to the cover and which may also be attached to the rectangular body is made up of a number of individual pads or a single pad that has equally spaced raised sections interconnected by equally spaced valleys and a cover that is deformed to be convex on the inside. The cover is made of a resilient material so as to be flattened when the cover is closed with an X-ray film loaded in the cassette. The X-ray film cassette is of rectangular shape and has a pair of hinge means on one side thereof and has a pair of latch means on the sides thereof.

The contour of the inner surface of the cover and the structure of the cushion pad or pads cooperate to uniformly press the intensifying sheet attached to the cover and the rectangular body against the X-ray film loaded in the cassette.

BRIEF DESCRIPTION OF THE DRAWINGS

FIG. 1 is a perspective view of the X-ray cassette with the cover open and the intensifying shield cut away to expose the two types of cushioning.

FIG. 2 is a section view of the cover shown in FIG. 1 through section 2—2.

FIG. 3 is a perspective view of the air channeled pad.

DESCRIPTION OF A PREFERRED EMBODIMENT

FIG. 1 shows an X-ray film cassette having a cover 1 hinged to a rectangular body 2 by hinges 3. Cover 1 has a pair of latch tabs 4 to mate with slidable latches 5 which may be activated by sliding the latches 5 to release or engage tabs 4 and thereby release or engage cover 1. In addition latches 5 may be released by insertion of a pin into holes 6 to cause latches 5 to release tabs 4. The cover 1 contains, and body 2 may contain individually attached or unattached pads 7 secured to the cover 1, and base 2. Secured to pads 7 are intensifying screens 8. However, if a pad 7 is not secured to the body 2, then the intensifying screen 8 is secured directly to the body 2. Whether or not pads 7, are attached or unattached they have air channels 9, running through the pads 7.

The contour of cover 1 is bowed inward toward the intensifying screens 8. The bowed contour of cover 1, aids in providing an equal pressure to be exerted upon the X-ray film, by the cover 1, both at the extremities of cover 1 and at the center of the cover 1. The contour of cover 1, as well as the pads 7, work together to provide support to the X-Ray film through the intensifying screens 8, as well as providing equal pressure over the total contact surface between the X-ray film and the intensifying screens 8.

In operation the X-ray film is inserted in the X-ray cassette between the intensifying screens 8 and then the cover 1 is closed and secured to the body 2 by latches 5. Since only the edges of the cover 1 are secured by hinges 3 and latches 5, the center of the cover 1 would have a tendency to raise up, this, however, is countered by the convex bow which actually straightens out when it meets resistance as the cover 1, is closed. The straightening process continues until all points of the surface of cover 1, are in the same plane. Therefore cover 1, will exert a uniform pressure on the intensifying screens 8. The pads 7 as the cover 1 is closed have a tendency to trap air and if not for the air passages 9 between the pads 7 unequal pressure would be exerted upon the intensifying screen 8 which in turn would create a non-uniform contact pressure between the intensifying screens 8 and the X-ray film causing light and dark spots on the developed X-ray film.

I claim:

1. An X-ray film cassette comprising a rectangular body having a front wall, a pair of side walls and a back wall; a rectangular cover secured at one side thereof to the back wall of said body by hinge means; a first pair of latch means provided at the sides of said cover and a second pair of latch means attached to the body to mate with the first pair, said secured latch means being manually operable to be moved from a latching position to a released position; a pair of slots provided in the front wall of the body to operate said secured latch means of the body; a cushion pad made of elastic material attached to the inner surface of the cover; a first intensifying sheet attached to the surface of the cushion pad; and a second intensifying sheet attached to the surface of the body; wherein the improvement comprises a number of air channels parallel to the cover provided in said cushion pads and a convex cover, convex to the inside of the cassette having a contour represented by concentric elliptical contour lines whose center is located at the center of the rectangular cover.

2. An X-ray film cartridge as defined in claim 1 wherein said cushion pad is made of foamed urethane.

3. An X-ray film cassette comprising a rectangular body having a front wall, a pair of side walls and a back wall; a rectangular cover secured at one side thereof to the back wall of said body by hinge means; a first pair of latch means provided at the sides of said cover and a second pair of latch means attached to the body to mate with the first pair, said secured latch means being manually operable to be moved from a latching position to a released position; a pair of slots provided in the front wall of the body to operate said secured latch means of the body; a first cushion pad made of elastic material attached to the inner surface of the cover and a second cushion pad made of elastic material attached to the inner surface of the body; a first intensifying sheet attached to the surface of the first cushion pad; and a second intensifying sheet attached to the surface of the second cushion pad; wherein the improvement comprises a number of air channels parallel to the cover provided in said cushion pads and a convex cover, convex to the inside of the cassette having a contour represented by concentric elliptical contour lines whose center is located at the center of the rectangular cover.

* * * * *